(12) United States Patent
Walker et al.

(10) Patent No.: US 11,552,417 B2
(45) Date of Patent: Jan. 10, 2023

(54) IRRIGATION CONTROLLER WITH TERMINAL CONNECTOR BLOCKS

(71) Applicant: Rain Bird Corporation, Azusa, CA (US)

(72) Inventors: Ryan L. Walker, San Diego, CA (US); Harvey J. Nickerson, El Cajon, CA (US); James R. Harris, Tucson, AZ (US); Young Suk Kim, San Diego, CA (US); Chao-Ming Kang, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 55 days.

(21) Appl. No.: 16/944,909

(22) Filed: Jul. 31, 2020

(65) Prior Publication Data
US 2021/0036447 A1 Feb. 4, 2021

Related U.S. Application Data

(60) Provisional application No. 62/881,644, filed on Aug. 1, 2019.

(51) Int. Cl.
| | |
|---|---|
| *H01R 12/70* | (2011.01) |
| *A01G 25/02* | (2006.01) |
| *A01G 25/16* | (2006.01) |
| *H01R 9/24* | (2006.01) |

(52) U.S. Cl.
CPC ......... *H01R 12/7094* (2013.01); *A01G 25/02* (2013.01); *A01G 25/16* (2013.01); *H01R 9/2416* (2013.01); *H01R 12/7076* (2013.01)

(58) Field of Classification Search
None
See application file for complete search history.

(56) References Cited

U.S. PATENT DOCUMENTS

| | | | |
|---|---|---|---|
| 3,930,706 A * | 1/1976 | Obuch | H01R 13/112 439/660 |
| 4,082,407 A * | 4/1978 | Smorzaniuk | H01R 12/00 439/59 |
| 6,842,667 B2 | 1/2005 | Beutler | |
| 7,574,285 B2 | 8/2009 | Kah | |
| 7,613,546 B2 | 11/2009 | Nelson | |
| 7,640,079 B2 | 12/2009 | Nickerson | |
| 8,977,400 B1 | 3/2015 | Porter | |
| 2008/0058964 A1 | 3/2008 | Nickerson | |
| 2014/0018965 A1 | 1/2014 | Pearson | |
| 2021/0287839 A1 | 9/2021 | Lee | |
| 2022/0224027 A1 | 7/2022 | Nickerson | |

\* cited by examiner

*Primary Examiner* — Ross N Gushi
(74) *Attorney, Agent, or Firm* — Fitch, Even, Tabin & Flannery, LLP

(57) ABSTRACT

In some embodiments, an irrigation control device is provided that includes adjacent terminal connector rows having a ridge portion between the rows, where the ridge portion is configured to support and guide wires to electrical connection pads of one row, and to support these wires above wires retained in another row of electrical connection pads. In some embodiments, the ridge portion offsets the wires from the different rows in the horizontal plane.

22 Claims, 12 Drawing Sheets

IRRIGATION CONTROLLER WITH TERMINAL CONNECTOR BLOCKS

CROSS-REFERENCE TO RELATED APPLICATION

This application claims the benefit of U.S. Provisional Application No. 62/881,644 filed Aug. 1, 2019, which is incorporated herein by reference in its entirety.

TECHNICAL FIELD

This invention relates generally to irrigation controllers and specifically relates to irrigation controllers having a terminal connector block for connecting wiring from the controller to irrigation station valves.

BACKGROUND

Terminal connector blocks for irrigation controllers are typically arranged in a horizontal row for an installer to access. Terminal connections are locations on the controller to which wires are connected to the controller. The wires can connect sensors to the controller at input terminals, or may connect devices controlled by the controller at output terminals. Output terminals are typically connected to electrically actuated valves. For example, the controller switches an output AC signal to an output terminal, and a wire coupled to the output terminal carries the AC signal to a solenoid that opens a valve allowing pressurized water to flow therethrough to one or more sprinklers. In a traditional controller, there are a variety of separate terminals including AC voltage signal input terminals, sensor input terminals, accessory connection terminals, a common line output terminal, a master valve output terminal and multiple station output terminals. An irrigation controller controlling eight stations will need eight separate output connection terminals and a common terminal, whereas a controller controlling twelve stations will need twelve separate output connection terminals and the common terminal. Increasing the number of stations controlled increased the number of terminals needed and; thus, the space needed for the connector block (also referred to as a connector strip). Many irrigation controllers are small and have limited space for a large number of output terminals.

BRIEF DESCRIPTION OF THE DRAWINGS

Disclosed herein are embodiments of systems, apparatuses and methods pertaining to controlling irrigation. This description includes drawings, wherein.

Figure 1:
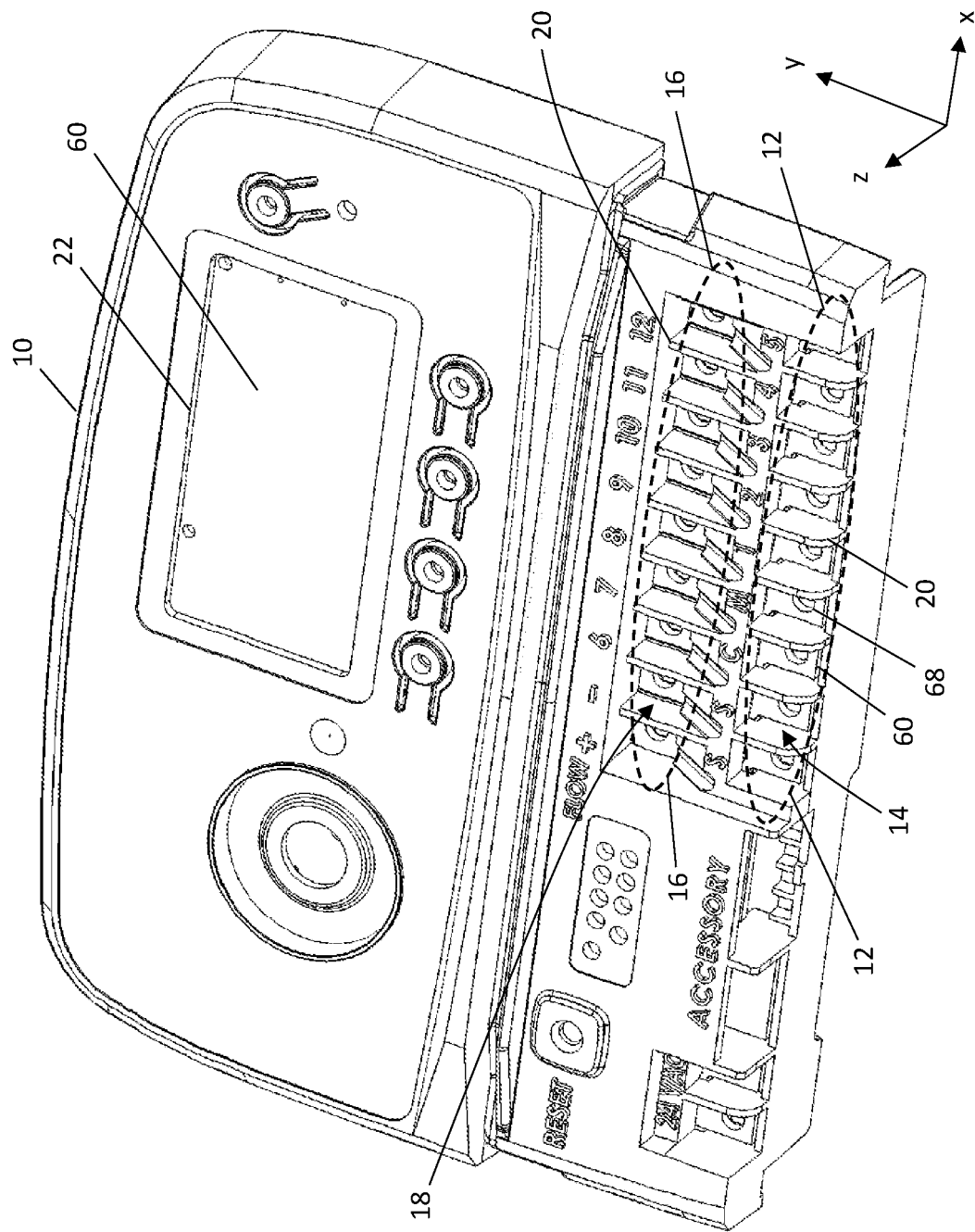
FIG. 1 is a perspective view of an irrigation controller with connector terminal rows in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful in providing and arranging terminal connector blocks in irrigation controllers. In some embodiments, multiple rows of terminal connector blocks are provided where the multiple rows are implemented in the same plane and connected directly to the circuit board at electrical connection pads on the circuit board with terminal connectors. In some embodiments, a ridge portion including an angled wall that separates the rows of terminal connector blocks. In some embodiments, the ridge portion supports the wires retained in one row of electrical connection pads above the wires retained in another row of terminal connector blocks. And in some embodiments, the angled wall supports and guides wires supported above the other row of terminal connector blocks to the electrical connection pads to be connected thereto. In some embodiments, the angled wall includes a wire guide arranged to guide the wire to a desired location for connection to the electrical connection pad, and retains the wire above the other row of terminal connector blocks. In some embodiments, the same terminal connectors are used at all electrical connection pads of the circuit board on the same plane of the circuit board without the need for risers or other conductive elements that account for differing heights between rows of connector terminal blocks relative to the circuit board (since in some embodiments, the terminal connectors are mounted at the same height in the plane of the electrical connection pads). In some embodiments, the rows of terminal connector blocks are offset from each other such that wires connected to one row of terminal connector blocks do not directly overlap the wires connected to another row of terminal connector blocks, allowing easier access to wires and terminal connectors underneath wires supported by the ridge. Further, in some embodiments, wires guides in the angled wall further assist in retaining the wires supported above a given row of terminal connector blocks in an offset orientation relative to the wires connected to another row of the terminal connector blocks.

Referring to FIGS. 1-14 through this description, several views are shown of an irrigation controller, and/or portions or components thereof that provide an arrangement of connector terminal rows in accordance with some embodiments.

An irrigation controller typically includes a housing, a user interface (e.g., display screen, buttons, dials, lights, etc.), a control circuit and memory for controlling operation of the controller and executing watering schedules, electrical connections for input power (or alternatively, a battery for power), other electrical components and switches (e.g., relays or triacs), various input connectors for sensors, accessories, etc., and output connectors such as a station output connection terminals, common line and master valve output terminal connections.

Figure 2:
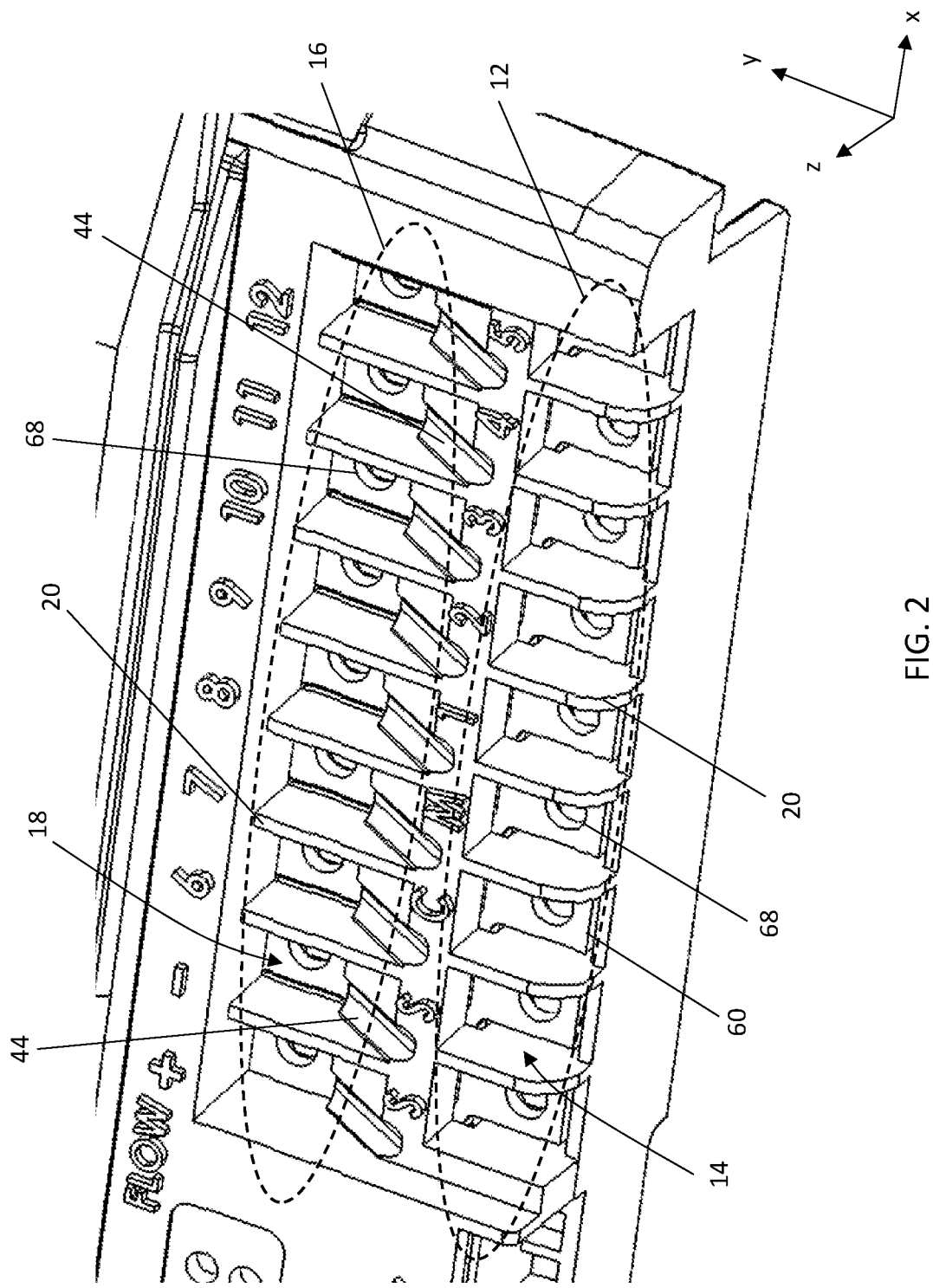
FIG. 2 is an enlarged perspective view of the connector terminal rows of FIG. 1 in accordance with some embodiments.
Figure 3:
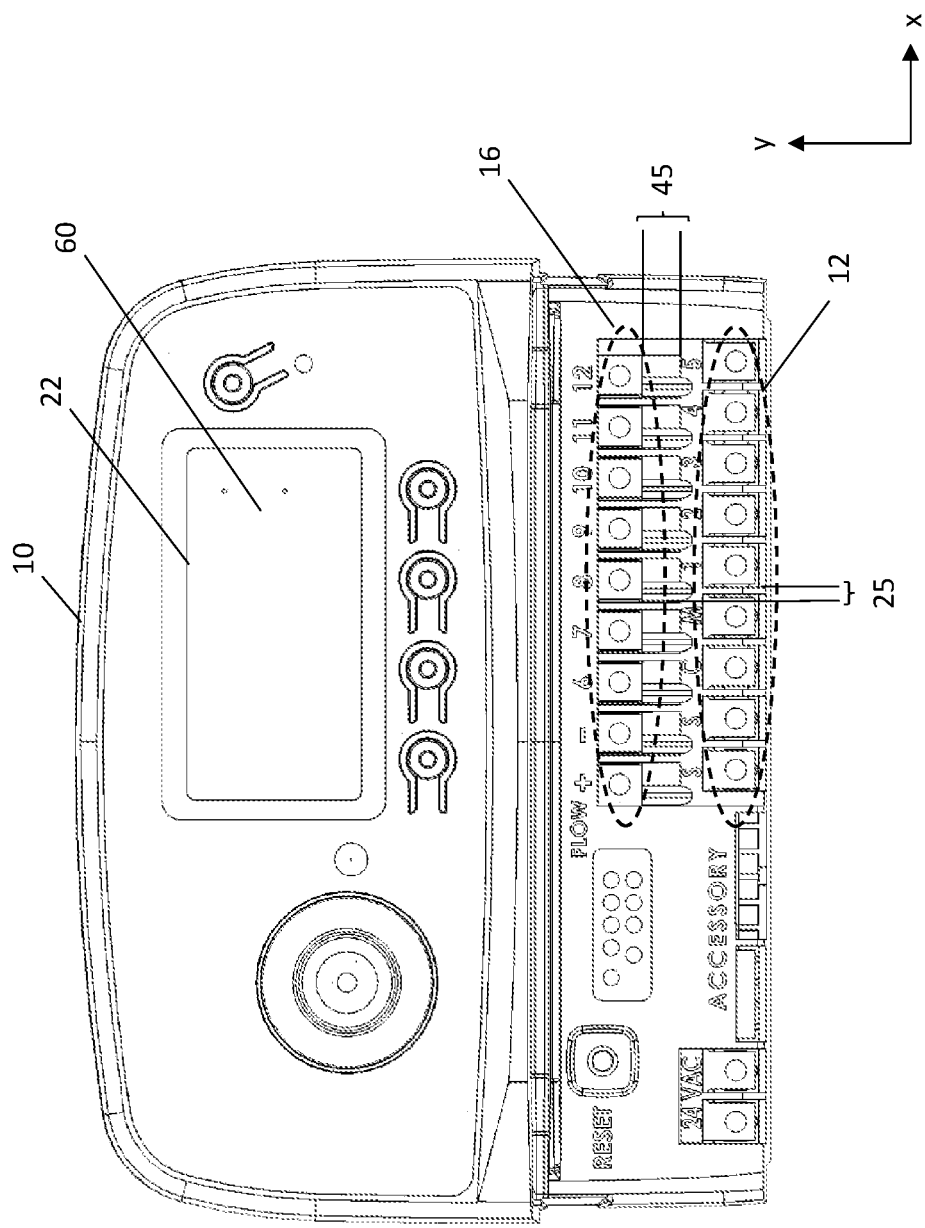
FIG. 3 is a front view of the irrigation controller of FIG. 1 in accordance with some embodiments.
Figure 4:
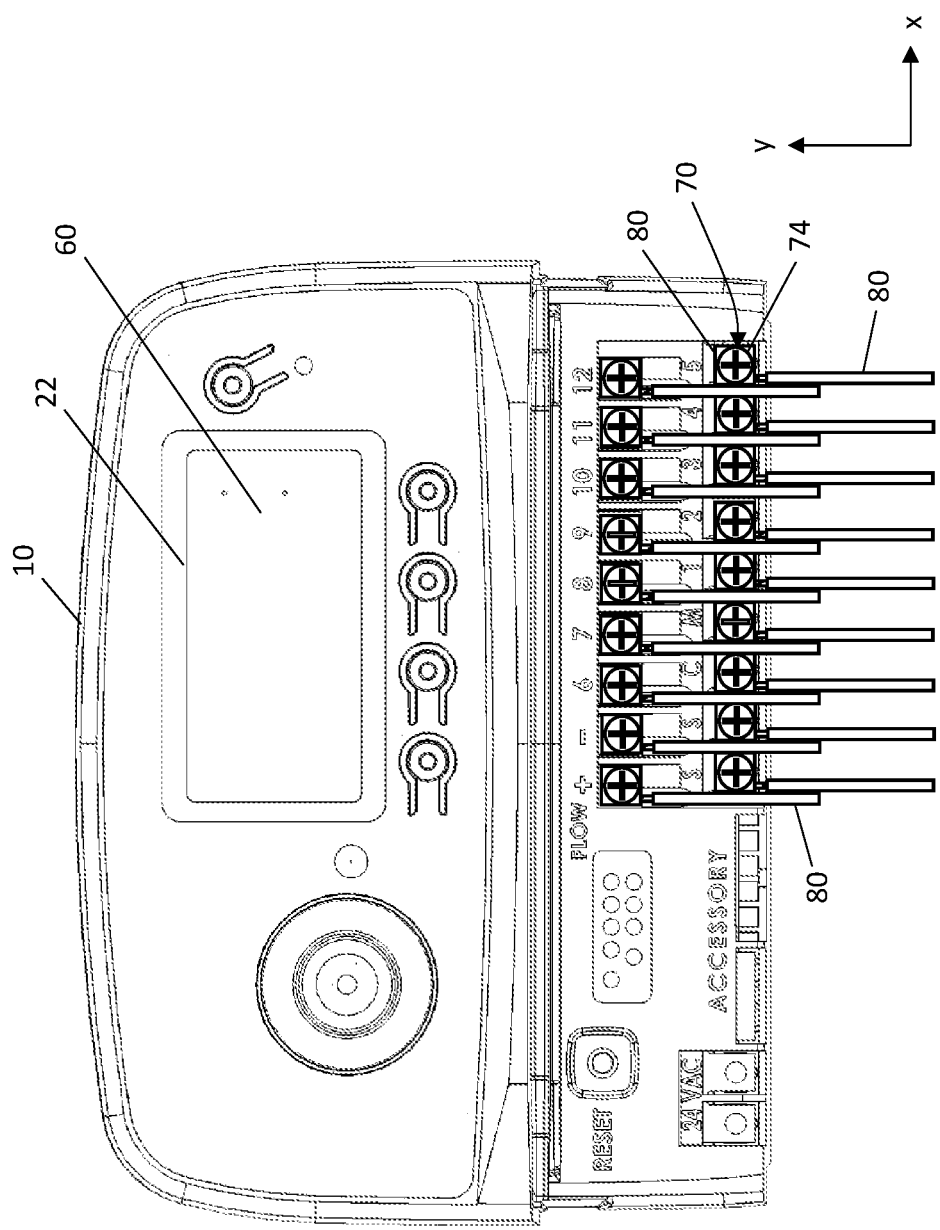
FIG. 4 is a front view of the irrigation controller of FIG. 1 including wires retained at terminal connectors of the connector terminal rows in accordance with some embodiments.

An exemplary housing 10 for an irrigation controller includes various openings to accommodate user interface features and electrical connectors of the controller. In some embodiments, the housing includes a first row 12 of openings 14 that form a "first connector terminal row area" and a second row 16 of openings 18 that form a "second connector terminal row area". Individual openings in the housing 10 are shown as reference numbers 14 and 18. In the views of FIGS. 1-2 and 4, a circuit board 60 of the controller is viewable through the openings 14 and 18, and viewable through a display screen opening 22. As illustrated, each row 12 and 16 is formed with multiple openings 14 and 18 separated by vertically oriented divider walls 20. It is understood that in some embodiments, a given connector terminal row area may not include divider walls such that a connector terminal row area may be formed by a single elongated opening in the housing. Accordingly, a connector terminal row area may be formed by one or more openings in the housing arranged in a row. In the illustrated embodiments, the first row 12 of openings 14 is adjacent the second row 16 of openings 18 and in the same horizontal plane. In the illustrated embodiments, the first row 12 and the second row 16 are offset from each other, e.g., see the horizontal opening offset 25 (offset in the x axis) in FIG. 3.

The circuit board 60 includes all electrical connections and connections, conduits and traces between connection locations of the circuit board 60. The circuit board 60 will have electrical devices mounted thereto including a control circuit (e.g., microprocessor, integrated circuit devices, one or more memories, switches, power components, surge components, etc.). To allow an output AC signal to be selectively switched to output terminal connectors of the controller, electrical connection pads 62 are provided at locations of the circuit board 60 that will be aligned with the openings 14 and 18 of the housing 10 (see FIG. 5). The electrical connection pads 62 are conductive and located on the top or upper surface of the circuit board 60. They may be embodied in a variety of ways, such as deposited, etched, placed, formed, painted, etc. on the circuit board 60. In some embodiments, each electrical connection pad 62 is a thin, flat piece of conductive metal soldered to the upper surface of the circuit board 60. These electrical connection pads 62 are electrically coupled to other portions of the circuit board using traces, conductors, conduits or connection pathways of the circuit board 60, for example, each electrical connection pad 62 is coupled to a respective switch under control of the main control circuit of the controller that switches a 24 volt AC signal to the electrical connection pad 62 and to any wire coupled to that electrical connection pad 62.

Figure 11:
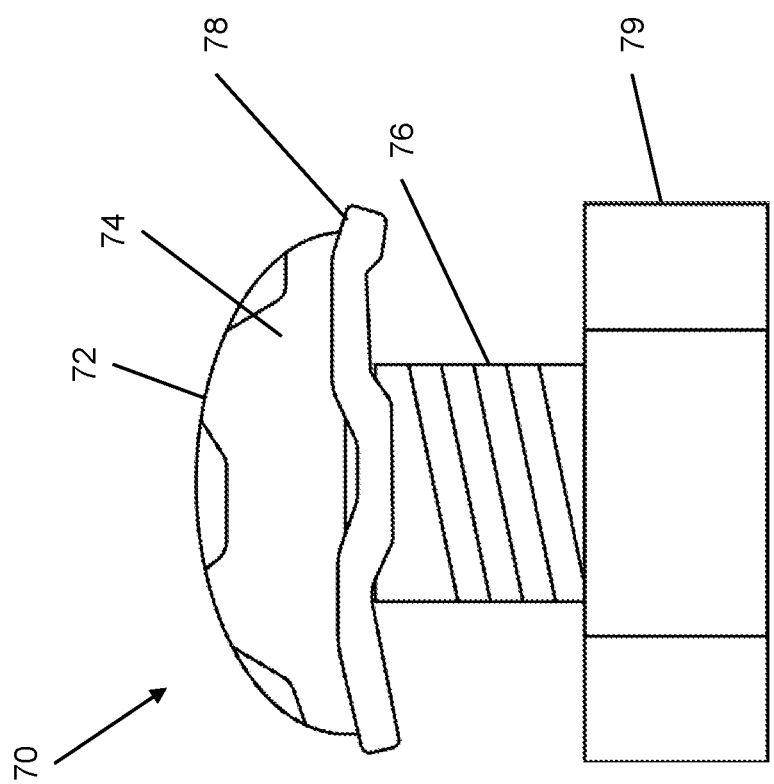
FIG. 11 is a simplified illustration of a terminal connector in the form of a screw and nut in accordance with some embodiments.

In the illustrated embodiments, the circuit board 60 further includes rows 64 and 66 of holes 68 formed in the circuit board and electrical connection pads 62 (e.g., see FIGS. 1-3 and 5). For example, each electrical connection pad 62 includes a corresponding hole 68. In some embodiments, the holes 68 are formed in the circuit board 60 before the electrical connection pads 62 are formed, attached or deposited. In other embodiments, the holes 68 are formed after the electrical connection pads 62. In the illustrated embodiments, holes 68 are useful to secure terminal connectors 70 to the circuit board 60. As shown in FIG. 11, terminal connectors 70 in the illustrated embodiments are each embodied as a screw 72 having a head 74 and a post 76. The post 76 passes through a locking plate 78 and the hole 68 at the electrical connection pad 62, and tightens into a fastening portion 79 (e.g., a hexagonally shaped nut) on the underside of the circuit board. The terminal connectors 70 are also shown in FIG. 4 which illustrates the heads 74 and edges of the locking plates 78. Generically, a respective terminal connector 70 is secured to a respective one of the electrical connection pads 62 of the first row 64 and the second row 66 via the first row 12 of openings 14 and the second row 16 of openings 18. Each terminal connector 70 is configured to receive a conductive exposed end of a wire 80 and retain the wire 80 by its conductive exposed end against the respective electrical connection pad 62. In the illustrated embodiments, the exposed ends of wires 80 are positioned under the locking plate 78, and the screw head 74 is tightened such that the exposed ends are held tightly against the electrical connection pads 62.

Figure 5:
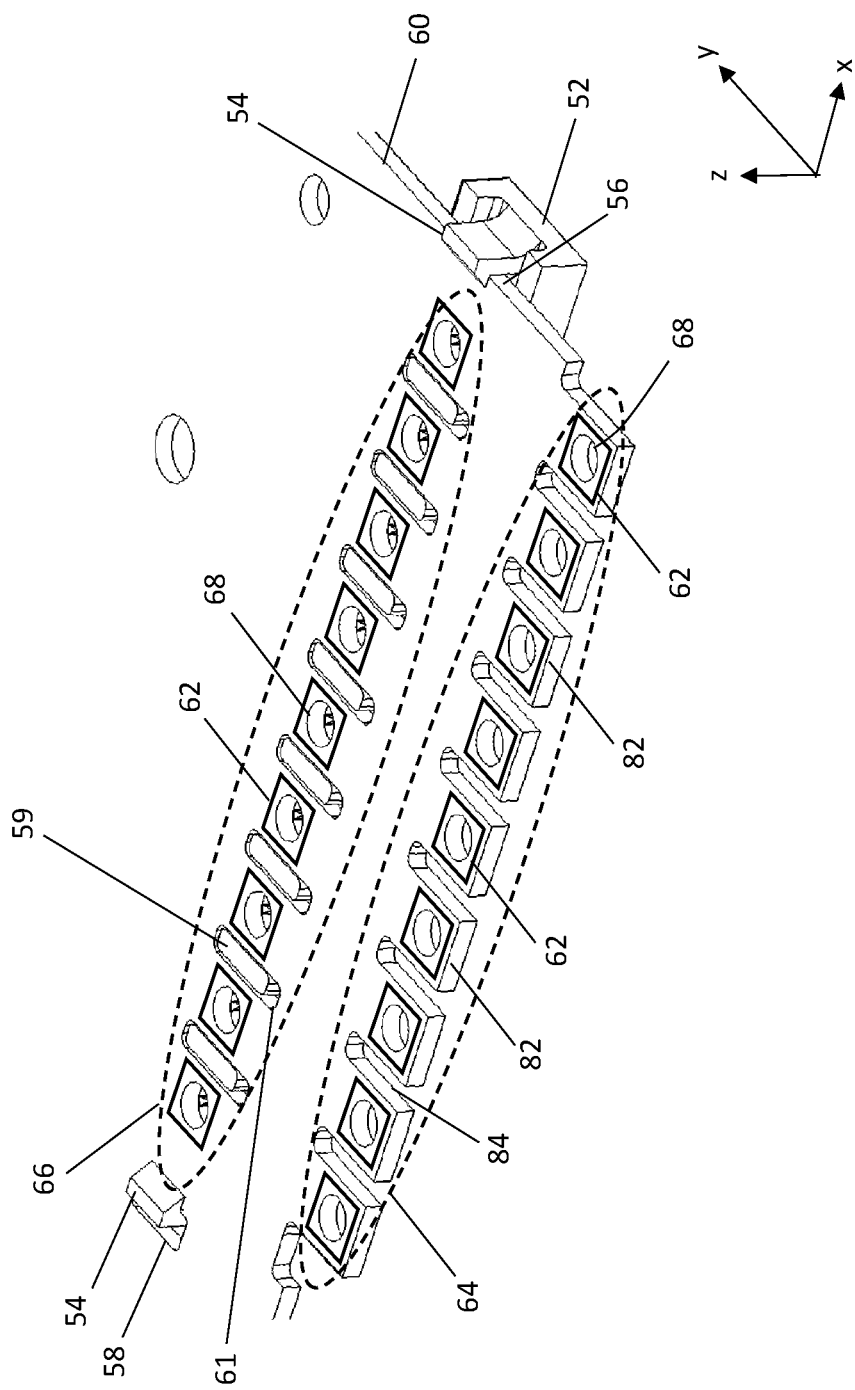
FIG. 5 is a perspective view of a top surface of a circuit board including rows of electrical connection pads in accordance with some embodiments.

In some embodiments, as seen in FIG. 5, the first row 64 of electrical connection pads 62 and the second row 66 of electrical connection pads are located on the circuit board 60 in a first horizontal plane (see plane A-A' in FIG. 10) at an upper exterior surface of the circuit board 60. The first row 64 and the second row 66 are arranged on the circuit board such when installed in the housing 10, the electrical connection pads 62 of the first row 64 are aligned with and accessible via the first row 12 of openings 14, and such that the electrical connection pads 62 of the second row 66 are aligned with and accessible via the second row 16 of openings 18 (e.g., see the views of FIGS. 1-2 and 4 although while the holes 68 are visible in these views, the electrical connection pads 62 are seen in FIG. 5.

Figure 10:
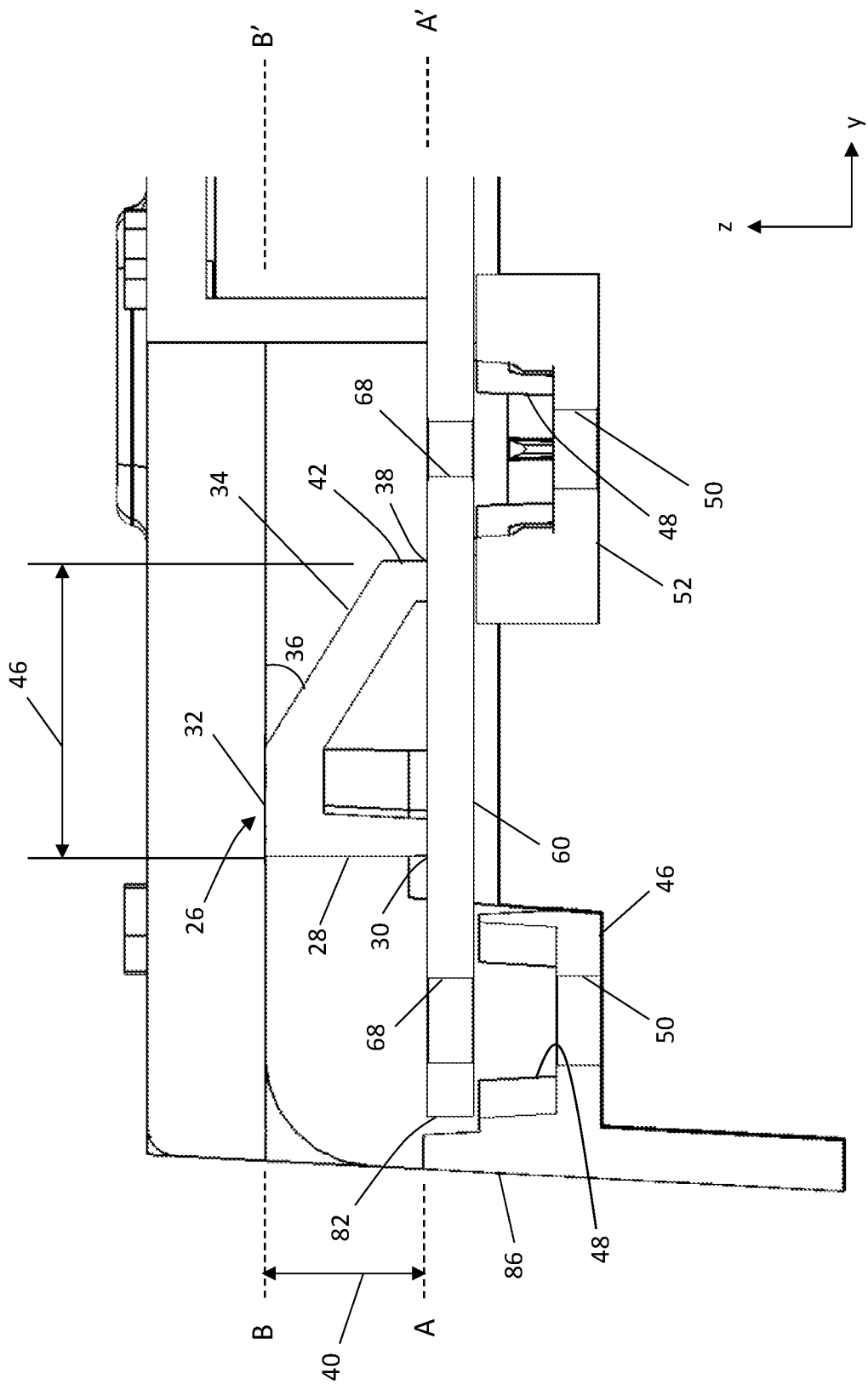
FIG. 10 is cutaway side elevation view of assembly of FIG. 9 in accordance with some embodiments.

In order to provide the second connector terminal row area mounted on the circuit board 60 on substantially the same plane A-A' (see FIG. 10) as and adjacent (e.g., adjacent about the y axis) to the first connector terminal row area without wires connected to one row interfering with wires connected to the other row, in some embodiments, the housing includes several structural features and arrangements. As variously illustrated, the housing 10 includes a ridge portion 26 (in some embodiments, also referred to as a ridge, and a row divider, for example) formed between the first row 12 and the second row 16. The ridge portion 26 includes a first ridge wall 28 extending substantially vertically from a first base 30 of the first row 12 of openings 14 to a peak 32 (e.g., a plateau) of the ridge portion 26. The peak 32 is elevated relative to the base 30 such that the peak 32 is in a horizontal plane above (in the z axis) the horizontal plane of the electrical connection pads 62. For example, as shown in FIG. 10, the peak 32 is in plane B-B' above plane A-A'. The ridge portion 26 further includes a second ridge wall 34 extending substantially downwardly at an angle 36 from the peak 32 to proximate a second base 38 of the second row 16 of openings 18. In some embodiments, for example, the angle 36 may be between about 20 and 70 degrees, about 30 and 60 degrees, or about 30-45 degrees. It is understood that these ranges are provided as examples and that the range of angles and the exact angle will be a function of the dimensions and arrangement of a given controller. In the illustrated embodiments, the ridge portion 26 is formed by the housing; however, in other embodiments, the ridge portion may be separate from the housing 10, e.g., the ridge portion is implemented in a separate housing or separate component fixed to the circuit board 60 or to another support structure that would locate the ridge portion in between the first rows 12 and 64 and the second rows 16 and 66.

Figure 12:
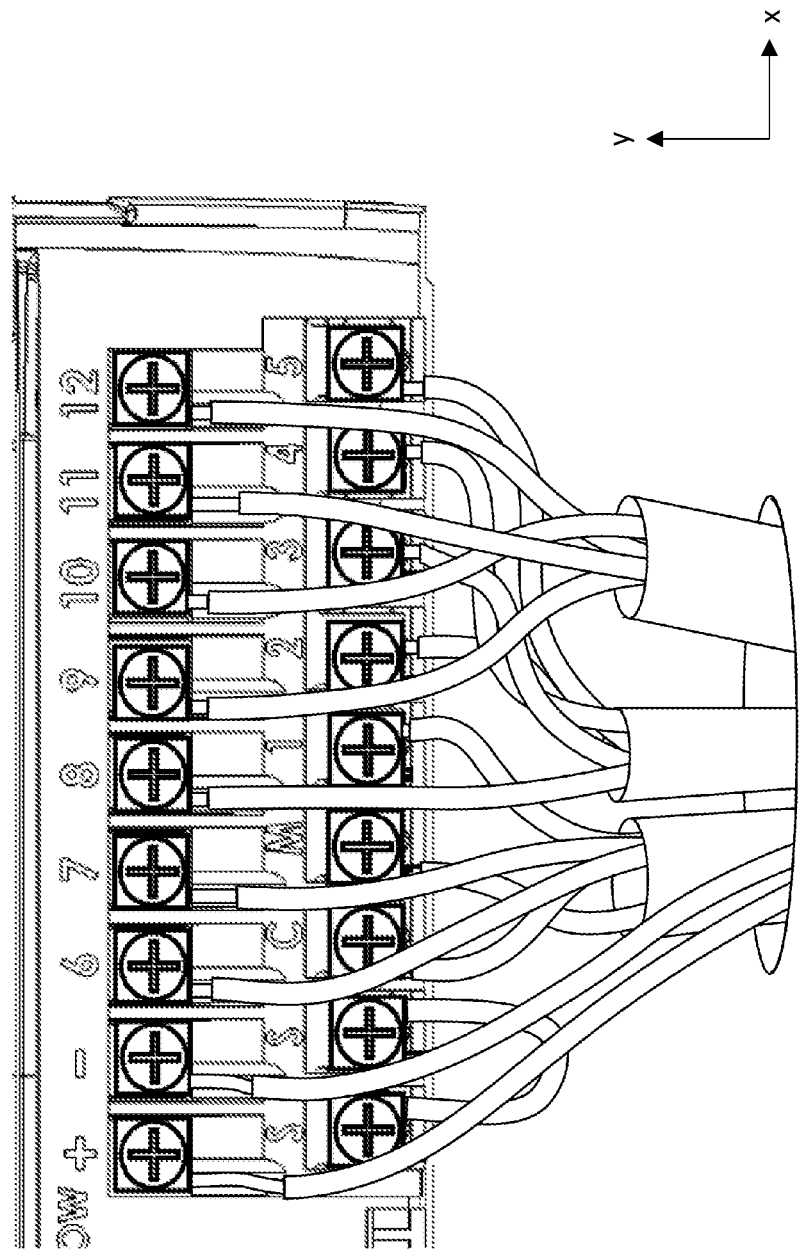
FIG. 12 is a front view of an irrigation controller with connector terminal rows and wires connected to terminal connectors in accordance with some embodiments.

The peak 32 is at the second horizontal plane B-B' located above the first horizontal plane A-A' and separated by at least a height 40 of the first ridge wall 28 and the second ridge wall 34. It is noted that the second ridge wall 34 may not extend downwardly at an angle completely to the base 38, e.g., as shown in FIG. 10, the second ridge wall 34 extends mostly to the base 38 and transitions to a lower vertical ridge wall 42 connecting to the base 38. In some embodiments, the second ridge wall 34 is configured to support and guide wires 80 to the second row 66 of electrical connection pads 62 to be retained thereagainst. And generally, the structure of the ridge portion 26 including the peak 32 and the second ridge wall 34 is configured to support the wires 80 retained in the second row 66 of electrical connection pads 62 above the wires 80 retained in the first row 64 of electrical connection pads 62. In this way, the wires 80 connected to the second row 66 of pads 62 (in the second row 16 of openings 18) will rest above the wires 80 of the first row 64 of pads 62 (in the first row 12 of openings 14). Thus, there will be no risk of exposed portions of the wires 80 connected to the second row 66 from contacting conductive portions of other wires 80 connected to the first row 64. It should be observed that the divider walls 20 of the first row 12 and the second row 16 provide a separation barrier between side-by-side oriented electrical connection pads of the first row 64 and second row 66 of electrical connection pads 62 to reduce wires in side-by-side openings from contacting each other. The views of FIGS. 4 and 12 illustrate the height separation of the wires connected to terminal connectors. It is noted that the width (y axis dimension in the FIGS.) of the peak 32 and the angle 36 and length of the second ridge wall 34 will define the spatial distance or offset in they axis between the first and second rows of openings/electrical connection pads, e.g., see offset 45 in FIG. 3.

In some embodiments, given the that first row 12 and the second row 16 of openings (and the first row 64 and the second row 66 of the electrical connection pads 62) are offset from each other in the x axis (see offset 25 in FIG. 3), the wires 80 extending from the second row exiting the openings of the second row 16 are offset in the x axis from the wires 80 extending from the first row exiting the openings of the first row 12. As can been in the views of FIGS. 4 and 12, the wires 80 from the second row are spatially separated (in the x axis) from the other wires so that an installer can more easily access the terminal connectors 70 of the wires 80 of the first row. This helps to avoid damage or unintended disconnections from physically moving wires (by hand or tool) extending from the second rows to expose the wires of the first row. For example, an installer may use the blade of a screwdriver to move or spread the wires from the second row and could unintentionally cut the protective insulator of the wires when moving them or cause them to disconnect from their respective electrical connection pads.

In some embodiments, to further assist with the alignment of wires in the second row 16 of openings as well as to assist in guiding the wires into the terminal connectors 70 of the second row 66 of electrical connection pads 62, wire channels 44 are optionally formed in the second ridge wall 34. The wire channels 44 extend the length of the second ridge wall 34. In some embodiments, they are offset (in the x axis) from a center of the second ridge wall 34, e.g., offset to one side. As illustrated in the FIGS. 1-4 and 12, the wire channels 44 are offset (in the x axis) to the left side of each opening 18 of the second row 16 next to a respective divider wall 20. It is noted that the wire channel 44 is not illustrated in the view of FIG. 10 due to the location of the cutaway plane. In embodiments using terminal connectors 70 embodied as screws, this is helpful to guide and route the exposed portion of a wire 80 down the second ridge wall 34 to underneath the left edge of the locking plate 78 such that a clockwise tightening action of the screw head 74 helps ensure that the exposed portion of the wire 80 is held tightly against the electrical connection pad 62. In these embodiments, wires exit from the openings 18 of the second row 16 in the space between the openings 14 of the first row 12 above the divider walls 20 of the first row 12. The views of FIGS. 4 and 12 shown the exiting of wires indicating the described offsetting of wires in the x axis. Accordingly, in some embodiments, the wires 80 existing the openings of the second row 16 are offset in height about the z axis (height 40 between planes A-A' and B-B') and offset about the x axis in the plane A-A' by the offset 25 (see FIGS. 3 and 4). The x axis offset in the horizontal plane can be further enhanced by connecting the exposed portions of the wires connected to the terminal connectors 70 of the first row, by positioning the exposed portion underneath the right edge of the locking plate 78 of the terminal connector instead of the left edge as illustrated in FIG. 4 (e.g., see the connection of some of the wires to the terminal connectors in the first (bottom) row in FIG. 12.

Figure 9:
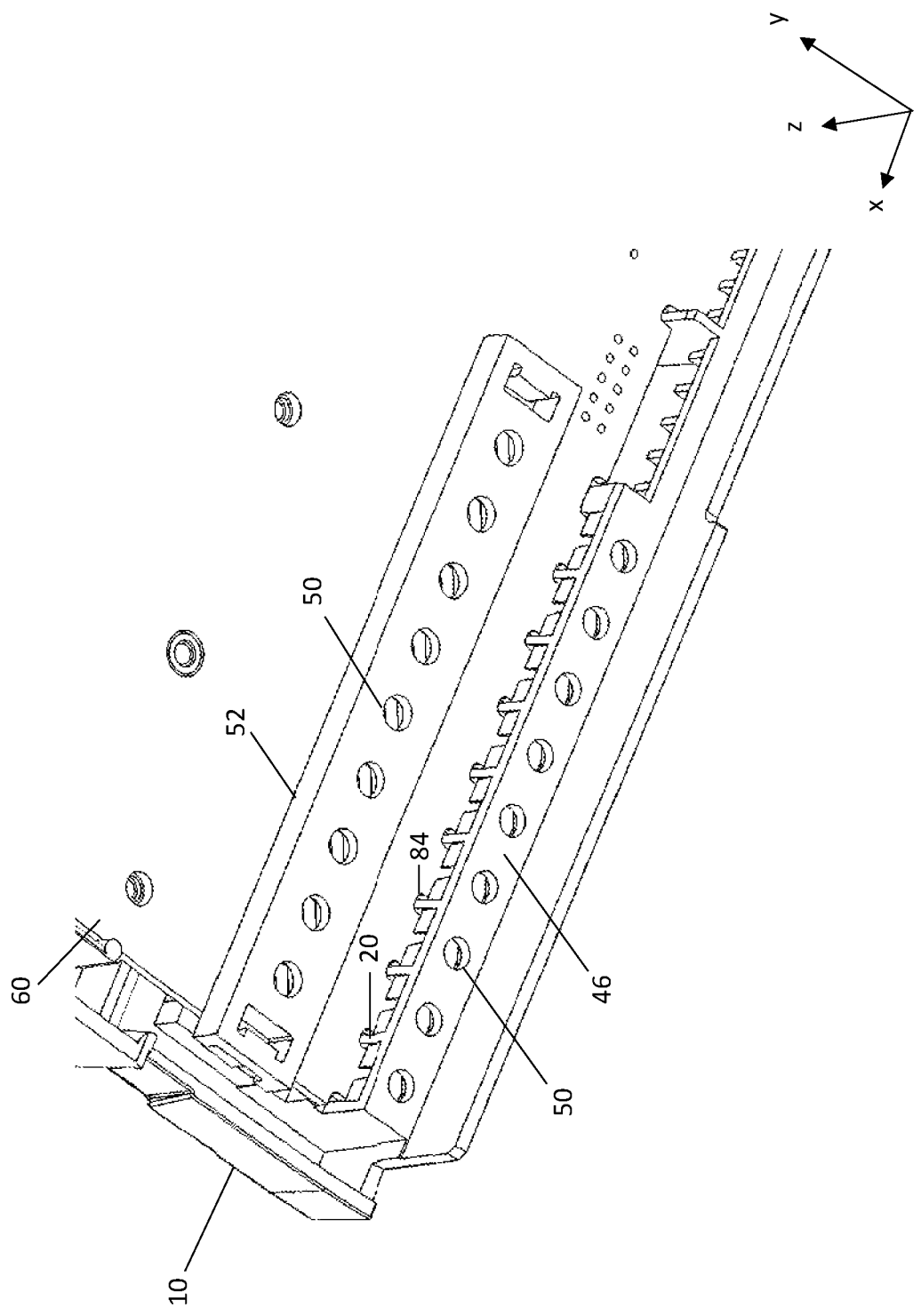
FIG. 9 is a bottom perspective view of a housing of the controller of FIG. 1 with the circuit board of FIG. 5 and the support plate of FIG. 6 positioned for normal operation in accordance with some embodiments.

In embodiments using terminal connectors 70 such as the screw connectors shown in FIGS. 4 and 11, additional features are provided in at least the housing to secure the terminal connectors to the circuit board 60. For example, as shown in FIGS. 9 and 10, the housing includes a lower support portion 46 having a recess 48 formed therein. The recess 48 is configured to receive a fastening portion (e.g., octagonally shaped fastening portion 79 of FIG. 11). The fastening portion is held in the recess 48 and receives the post 76 which is tightened into the fastening portion. As illustrated, holes 50 are formed in the lower support portion 46, e.g., to allow the post to extend therethrough.

Figure 6:
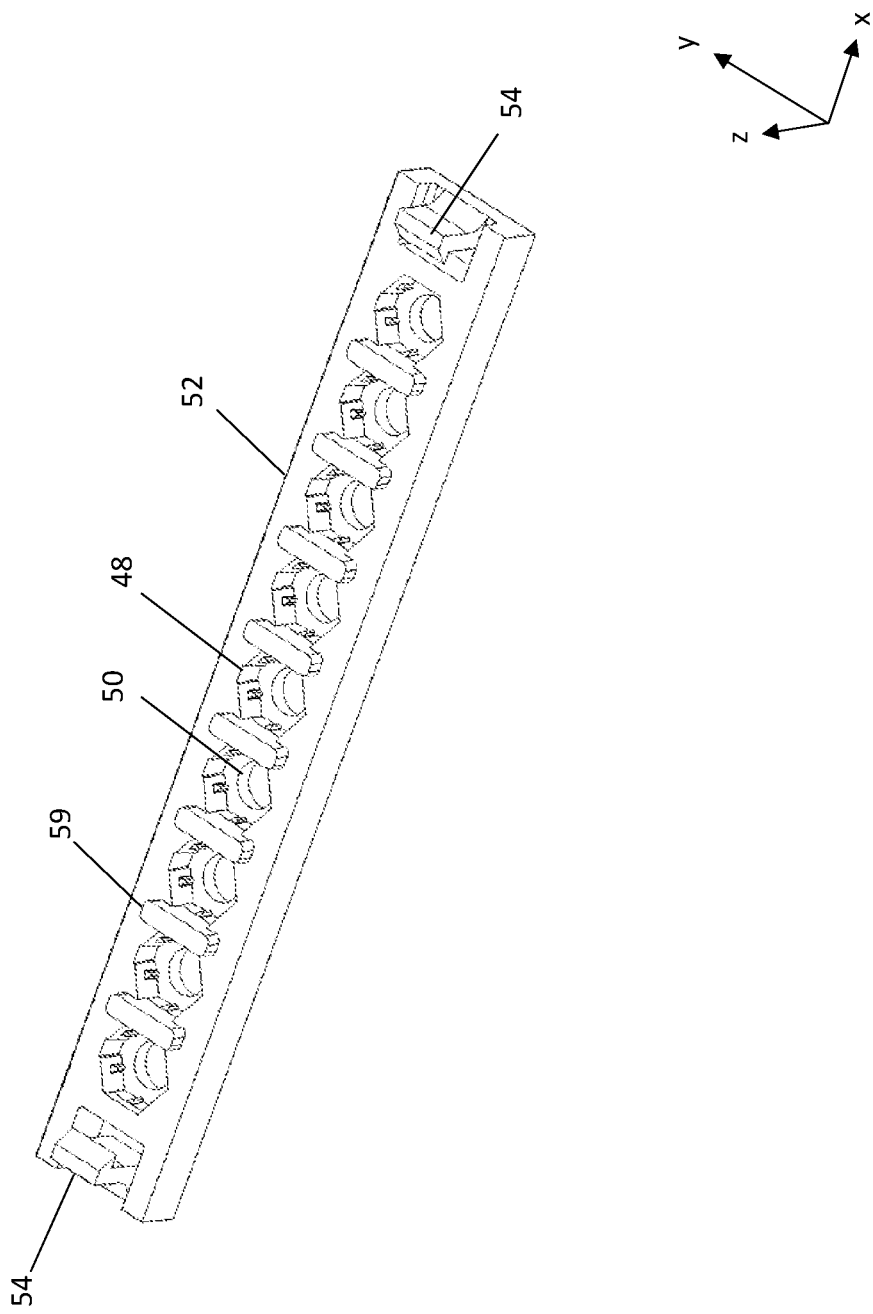
FIG. 6 is a perspective view of a support plate configured to allow fastening of terminal connectors in accordance with some embodiments.
Figure 7:
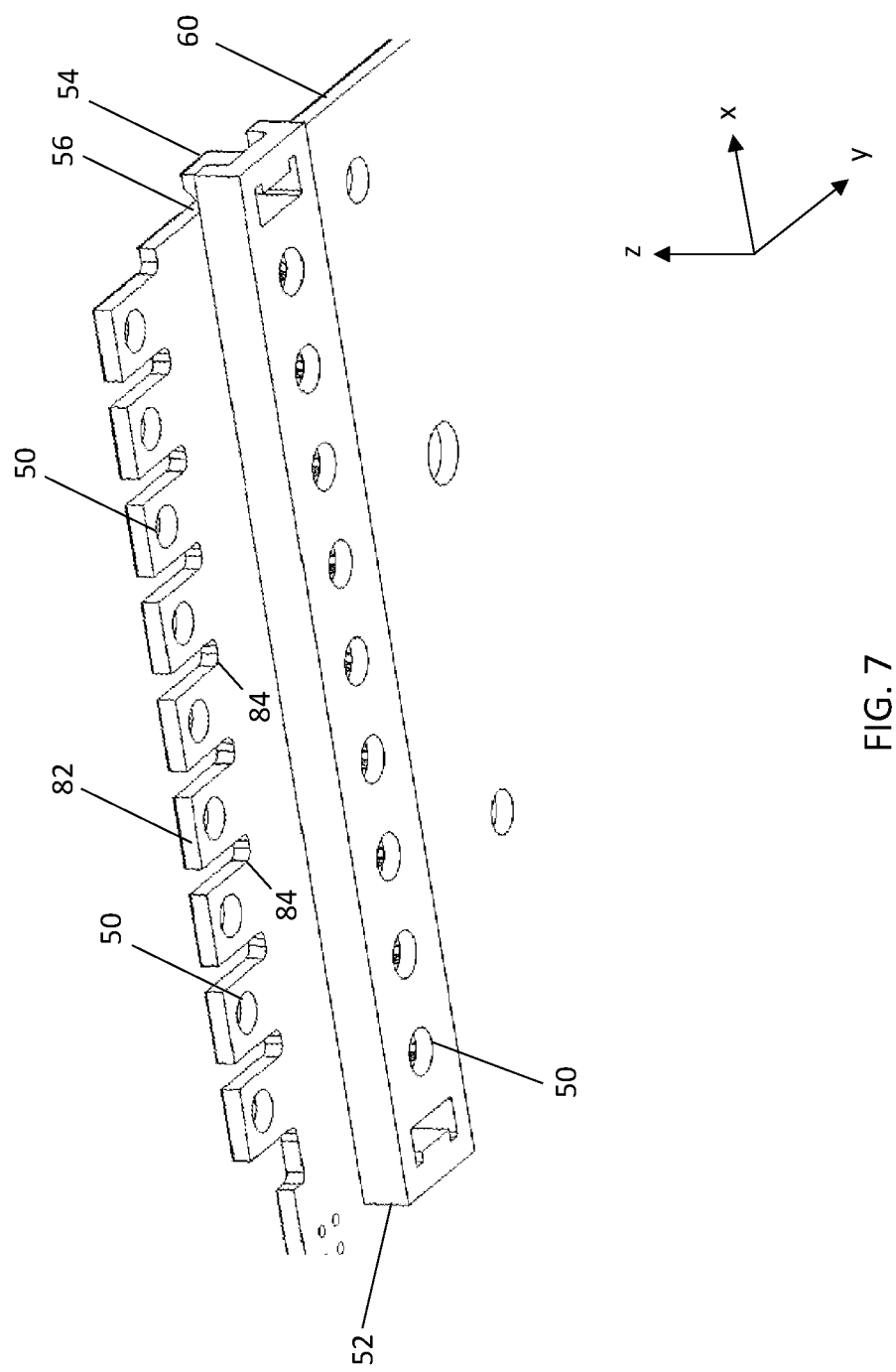
FIG. 7 is a perspective view of the support plate of FIG. 6 coupled to an under surface of the circuit board of FIG. 5 in accordance with some embodiments.
Figure 8:
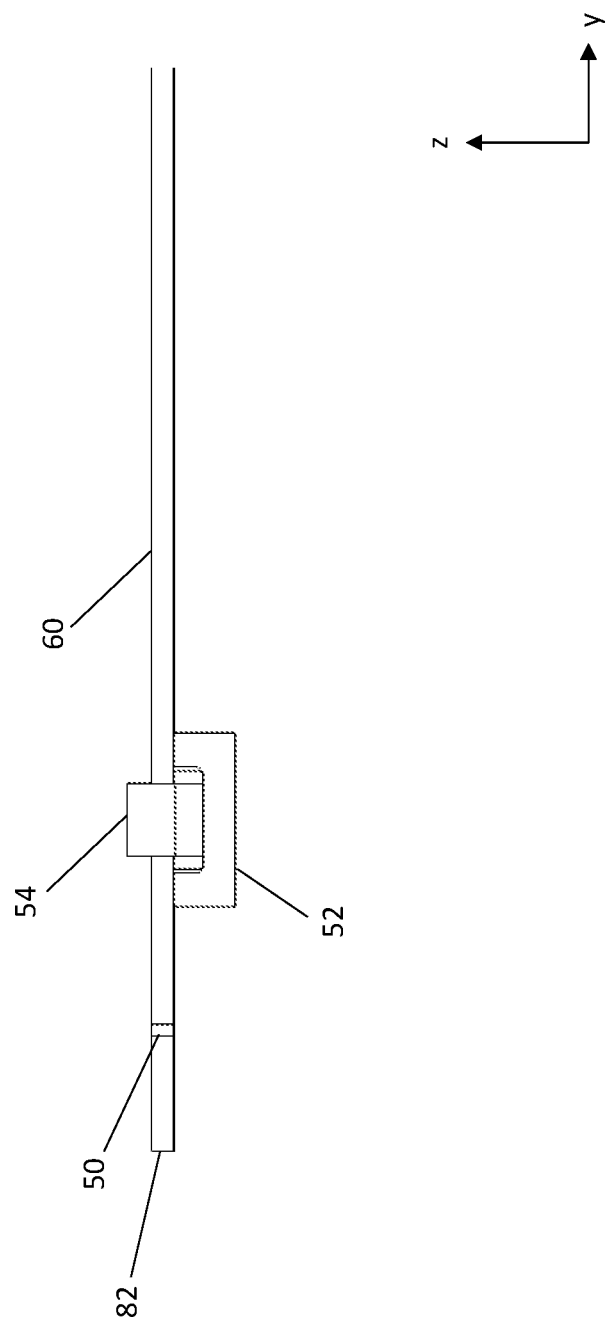
FIG. 8 is a side elevation view of the circuit board of FIG. 5 with the support plate of FIG. 6 coupled thereto in accordance with some embodiments.

In some embodiments, and in the event screw type terminal connectors 70 are used for the electrical connection pads 62 of the second row 66, as seen in at least FIGS. 6 and 7, a support plate 52 (see FIG. 6) is coupled to the circuit board 60 on the underneath surface of the circuit board (see FIG. 7). For example, in some embodiments, the support plate 52 includes tabs 54 (also referred to as clips or latches) that snap fit over one edge 56 of the circuit board 60 and through over an edge of an opening 58 of the circuit board 60 (see FIG. 5). To remove the support plate 52, the tabs 54 are moved outwardly to allow the support plate 52 to be disconnected. As shown in FIGS. 5-9, the support plate 52 includes corresponding recesses 48 and holes 50 that align with the second rows 16 and 66. Each recess 48 is configured to receive a fastening portion (e.g., octagonally shaped fastening portion 79 of FIG. 11). The fastening portion is held in the recess 48 and receives the post 76 which is tightened into the fastening portion. As illustrated, holes 50 in the support plate 52 allow the posts to extend therethrough. In some embodiments, the support plate 52 includes support posts 59 (see FIGS. 5-6) spaced to extend into corresponding openings 61 (see FIG. 5) in the circuit board 60. These support posts 59 assist with the alignment of the support plate 52 to the circuit board 60 and to limit pressure on the circuit board 60 when attaching terminal connectors 70. Generically, in some embodiments, the support plate 52 is configured to receive a fastening portion of the terminal connector 70 to assist in the connection for the terminal connector 70 to the circuit board 60. And in some embodiments, the support plate 52 is configured to support connection of the terminal connectors 70 to the electrical connection pads 62 of the second row 66.

In some embodiments, the first row 64 of electrical connection pads 62 (and holes 68) are formed at a front edge 82 of the circuit board 60 (see FIG. 5). Grooves 84 are formed in the circuit board 60 at the front edge 82 allowing divider walls 20 of the housing 10 to extend into the space provided by the grooves 84. This assists in aligning the circuit board 60 and its electrical connection pads 62 in the first row 12 of openings 14, while utilizing divider walls 20 to separate side-by-side openings 14 in the first row 12. In the view of FIG. 9, the circuit board 60 is illustrated having been inserted into position with the divider walls 20 fitting into the grooves 84. It is noted that despite the presence in some embodiments of divider walls 20 in first and second rows 12/16 of openings 14/18, generically, the first ridge wall 28 and the second ridge wall 34 are understood to encompass one continuous wall extending across the length (about the x axis) of the respective rows or a wall that is broken up or segmented into sections by divider walls 20.

In some embodiments, the first row 64 of electrical connection pads 62 and walls of the first row 12 of openings 14 are configured such that the electrical connection pads 62 are easily accessible near the front edge 82 of the circuit board. For example, while the first ridge wall 28 at the back of the openings 14 of the first row 12 extends vertically upward from the base 30, as shown in FIG. 10, the housing 10 includes a front wall 86 that extends generally downward vertically from the base 30 of the first opening 14. As such, the electrical connection pad 62 of the first row 64 and its terminal connector 70 are easily accessible to an installer. In accordance with several embodiments, the second row 16 of openings (and second row 66 of electrical connection pads 62) are configured with the ridge portion 26 to create an offset in elevation (about the z axis) and an offset in the horizontal plane (about the x axis) between wires connected to and exiting the two rows. Accordingly, multiple rows (two or more) of terminal connector blocks can be oriented closely together in a small amount of space with ease of access to all rows and with little risk of wire damage, electrical shorting and/or unintended wire disconnection. This is further accomplished in some embodiments by maintaining all electrical connection pads in the same plane on the board, and connecting to the electrical connection pads of the different rows in the same plane. That is, the same terminal connectors are used for all rows, without the need to use height compensating conductive coupling structures, leading to low cost and closely spaced terminal connectors in an irrigation controller. Further, wires may be connected to electrical connection pads 62 exiting the openings of the first and second rows 12 and 16 in the same direction instead of opposite directions, such wires existing in the same direction in the y axis as can be seen in FIGS. 4 and 12.

It is understood that in some embodiments, the housing 10 is a housing for a traditional stand-alone irrigation controller that includes a user interface and programming for users to define and program watering and output control signaling to connected irrigation valves. In other embodiments, the housing 10 may be implemented in an irrigation controller that lacks a user interface and/or for which some or all of the watering programming is done at a remote device in communication with the irrigation controller. For example, a remote computer, server, mobile device, smart phone, other irrigation controller, etc. may be used to generate the programming for the controller. As such, generically, in some embodiments, the term "irrigation control unit" is used to at least encompass all such irrigation controllers. It is further understood that the electrical components that may be coupled or attached to the circuit board 60 described herein depend on the specific implementation of the control device and are understood in the art. It is further understood that the controller may include more than one circuit board, such as one circuit containing the main control circuitry and another circuit board containing the output electrical connectors or other backplane electrical connectors.

Various systems, apparatuses and methods are provided herein. In some embodiments, an irrigation control device comprises: a housing, a circuit board, and a plurality of terminal connectors. The housing comprises a first row of one or more openings forming a first connector terminal row area; and a second row of one or more openings forming a second connector terminal row area, the second row being located proximate to and adjacent the first row. The circuit board comprises: a first row of electrical connection pads; and a second row of electrical connection pads, wherein the electrical connection pads of the first row and the second row are located in a first horizontal plane at an upper exterior surface of the circuit board, and wherein the circuit board is positioned relative to the housing such that the first row of electrical connection pads is aligned with and accessible via the first row of the one or more openings, and such that the second row of electrical connection pads is aligned with and accessible via the second row of the one or more openings. The plurality of terminal connectors are secured to a respective one of the electrical connection pads of the first row of electrical connection pads and the second row of electrical connection pads, wherein each terminal connector is configured to receive a conductive exposed end of a wire and retain the wire at the conductive exposed end against the respective electrical connection pad. The housing further comprises: a ridge portion located between the first and second rows of the one or more openings, the ridge portion comprising a first ridge wall extending substantially vertically from a first base of the first row of the one or more openings to a peak of the ridge portion; and a second ridge wall extending substantially downwardly at an angle between about 20 and 70 degrees from the peak of the ridge portion to proximate a second base of the second row of one or more openings; wherein the peak of the ridge portion is elevated from the base of the first and second rows of the one or more openings such that the peak is at a second horizontal plane located above the first horizontal plane and separated by at least a height of the first ridge wall and the second ridge wall, wherein the second ridge wall is configured to support and guide wires to the second row of electrical connection pads to be retained thereagainst; and wherein the ridge portion is configured to support the wires retained in the second row of electrical connection pads above wires retained in the first row of electrical connection pads.

In some embodiments, it is noted that the terms "first connector terminal row" and the "second connector terminal row" are used to refer to the components forming each of these areas, e.g., in some embodiments, the first and second terminal connector rows comprise the first and second rows 12/16 of openings 14/18, the first and second rows 64/66 of electrical terminal connection pads 62, and any other support structure such as housing that bound and/or form these rows. In other embodiments, the components that comprise the first and second connector terminal rows may differ. In some embodiments, the first and second terminal connector rows are horizontally offset from each other. In some embodiments, the first and second terminal connector rows may be separated by or have a ridge portion (or ridge) separating the rows. In some embodiments, the ridge is configured to support the wires retained in and extending from the second terminal connector row above the wires retained in and extending from the first terminal connector row. In some embodiments, the ridge includes an angled ridge wall extending substantially downwardly at an angle at least a portion of a distance to electrical connection pads of the second terminal connector row, wherein the angled ridge wall is configured to support and guide the wires retained in and extending from the second terminal connector row.

In some embodiments, an irrigation control device comprises: a circuit board; a first connector terminal row comprising a first row of plurality of electrical connection pads coupled to the circuit board; a second connector terminal row adjacent to the first connector terminal row and comprising a first row of plurality of electrical connection pads coupled to the circuit board; and a plurality of terminal connectors, each secured to a respective electrical connection pad of the first and second connector terminal rows, wherein the plurality of terminal connectors are secured to the electrical connection pads of the first and second terminal connector rows in a first horizontal plane, wherein each terminal connector is configured to receive a conductive exposed end of a wire and retain the wire at the conductive exposed end against the respective electrical connection pad; and a ridge located between the first and second connector terminal rows, wherein the ridge comprises a peak elevated from the first horizontal plane, wherein the ridge is configured to support the wires retained in and extending from the second terminal connector row above the wires retained in and extending from the first terminal connector row.

In some embodiments, an irrigation control device comprises: a circuit board; a first connector terminal row located in a first horizontal plane; a second connector terminal row located in the first horizontal plane adjacent to the first connector terminal row; a plurality of terminal connectors, each secured to a respective one of electrical connection pads of the first and second connector terminal rows, wherein each terminal connector is configured to receive a conductive exposed end of a wire and retain the wire against the respective electrical connection pad; and a ridge located between the first and second connector terminal rows and extending above the first horizontal plane, wherein the ridge is configured to support the wires retained in and extending from the second terminal connector row above the wires retained in and extending from the first terminal connector row.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An irrigation control device comprising:
    a housing comprising:
        a first row of one or more openings forming a first connector terminal row area; and
        a second row of one or more openings forming a second connector terminal row area, the second row located proximate to and adjacent the first row;
    a circuit board comprising:
        a first row of electrical connection pads; and
        a second row of electrical connection pads,
        wherein the electrical connection pads of the first row and the second row are located in a first horizontal plane at an upper exterior surface of the circuit board,
        wherein the circuit board is positioned relative to the housing such that the first row of electrical connection pads is aligned with and accessible via the first row of the one or more openings, and such that the second row of electrical connection pads is aligned with and accessible via the second row of the one or more openings;
    a plurality of terminal connectors, each terminal connector secured to a respective one of the electrical connection pads of the first row of electrical connection pads and the second row of electrical connection pads, wherein each terminal connector is configured to receive a conductive exposed end of a wire and retain the wire at the conductive exposed end against the respective electrical connection pad; and
    wherein the housing further comprises:
        a ridge portion located between the first and second rows of the one or more openings, the ridge portion comprising:
            a first ridge wall extending substantially vertically from a first base of the first row of the one or more openings to a peak of the ridge portion; and
            a second ridge wall extending substantially downwardly at an angle between about 20 and 70 degrees from the peak of the ridge portion to proximate a second base of the second row of one or more openings;
        wherein the peak of the ridge portion is elevated from the base of the first and second rows of the one or more openings such that the peak is at a second horizontal plane located above the first horizontal plane and separated by at least a height of the first ridge wall and the second ridge wall,
        wherein the second ridge wall is configured to support and guide wires to the second row of electrical connection pads to be retained thereagainst; and
        wherein the ridge portion is configured to support the wires retained in the second row of electrical connection pads above wires retained in the first row of electrical connection pads.

2. The irrigation control device of claim 1, further comprising wire channels formed in the second ridge wall, each wire channel extending a length of the second ridge wall, wherein the wire channels are configured to guide the wires to the second row of electrical connection pads at a location of the wire channels within the second ridge wall.

3. The irrigation control device of claim 2, wherein the wire channels are offset from a center of the openings of the second row of one or more openings.

4. The irrigation control device of claim 1, further comprising divider walls extending from the first ridge wall and from the second ridge wall, the divider walls configured to provide a separation barrier between side-by-side oriented electrical connection pads of the first and second rows of electrical connection pads.

5. The irrigation control device of claim 1, further comprising a plurality of holes formed in the circuit board at the second row of electrical connection pads.

6. The irrigation control device of claim 1, further comprising a support plate connected to an under surface of the circuit board proximate the second row of electrical connection pads, wherein the support plate is configured to receive a fastening portion of the terminal connector to assist in the connection for the terminal connector to the circuit board.

7. The irrigation control device of claim 1, wherein the terminal connectors each comprise:
a screw having a head and a post;
a locking plate that the post extends therethrough such that the exposed portion of a wire is held against the electrical connection pad by the locking plate; and
a fastening nut to receive a portion of the post.

8. The irrigation control device of claim 1, wherein the second row of one or more openings and the second row of electrical connection pads are horizontally offset in the first horizontal plane from the first row of one or more openings and the first row of electrical connection pads such that wires exiting the second row of one or more openings are horizontally offset from the wires exiting the first row of one or more openings.

9. An irrigation control device comprising:
a circuit board;
a first connector terminal row comprising a first row of plurality of electrical connection pads coupled to the circuit board;
a second connector terminal row adjacent to the first connector terminal row and comprising a second row of plurality of electrical connection pads coupled to the circuit board;
a plurality of terminal connectors, each secured to a respective electrical connection pad of the first and second connector terminal rows, wherein the plurality of terminal connectors are secured to the electrical connection pads of the first and second connector terminal rows in a first horizontal plane, wherein each terminal connector is configured to receive a conductive exposed end of a wire and retain the wire at the conductive exposed end against the respective electrical connection pad; and
a ridge located between the first and second connector terminal rows, wherein the ridge comprises a peak elevated from the first horizontal plane, wherein the ridge is configured to support the wires retained in and extending from the second terminal connector row above the wires retained in and extending from the first connector terminal row;
wherein the ridge includes an angled ridge wall extending substantially downwardly at an angle from the peak to at least a portion of a distance to the electrical connection pads of the second connector terminal row, wherein the angled ridge wall is configured to support and guide the wires retained in and extending from the second connector terminal row.

10. The irrigation control device of claim 9, further comprising wire channels formed in the angled ridge wall, the wire channels configured to guide the wires to the electrical connection pads of the second connector terminal row.

11. The irrigation control device of claim 9, further comprising a housing forming the first and second connector terminal rows, wherein the housing comprises the ridge.

12. The irrigation control device of claim 9, further comprising divider walls in the first and second connector terminal rows and configured to provide a separation barrier between side-by-side oriented electrical connection pads of the first and second connector terminal rows.

13. The irrigation control device of claim 9, wherein the electrical connection pads of the second connector terminal row are horizontally offset in the first horizontal plane from the electrical connection pads of the first connector terminal row such that the wires exiting the second connector terminal row are horizontally offset from the wires exiting the first connector terminal row.

14. The irrigation control device of claim 9, wherein the first connector terminal row is horizontally offset in the first horizontal plane from the second connector terminal row such that the wires exiting the second connector terminal row are horizontally offset from the wires exiting the first connector terminal row.

15. An irrigation control device comprising:
a circuit board;
a first connector terminal row comprising a first row of plurality of electrical connection pads coupled to the circuit board;
a second connector terminal row adjacent to the first connector terminal row and comprising a second row of plurality of electrical connection pads coupled to the circuit board;
a plurality of terminal connectors, each secured to a respective electrical connection pad of the first and second connector terminal rows, wherein the plurality of terminal connectors are secured to the electrical connection pads of the first and second connector terminal rows in a first horizontal plane, wherein each terminal connector is configured to receive a conductive exposed end of a wire and retain the wire at the conductive exposed end against the respective electrical connection pad;
a ridge located between the first and second connector terminal rows, wherein the ridge comprises a peak elevated from the first horizontal plane, wherein the ridge is configured to support the wires retained in and extending from the second connector terminal row above the wires retained in and extending from the first connector terminal row; and
a support plate connected to an under surface of the circuit board, wherein the support plate is configured to support connection of the terminal connectors to the electrical connection pads of the second connector terminal row.

16. An irrigation control device comprising:
a circuit board;
a first connector terminal row located in a first horizontal plane;
a second connector terminal row located in the first horizontal plane adjacent to the first connector terminal row;

a plurality of terminal connectors, each secured to a respective one of electrical connection pads of the first and second connector terminal rows, wherein each terminal connector is configured to receive a conductive exposed end of a wire and retain the wire against the respective electrical connection pad; and a ridge located between the first and second connector terminal rows and extending above the first horizontal plane, wherein the ridge is configured to support the wires retained in and extending from the second connector terminal connector row above the wires retained in and extending from the first connector terminal row;

wherein the ridge includes an angled ridge wall extending substantially downwardly at an angle at least a portion of a distance to the electrical connection pads of the second connector terminal row, wherein the angled ridge wall is configured to support and guide the wires retained in and extending from the second connector terminal row.

17. The irrigation control device of claimer 16, further comprising wire channels formed in the angled ridge wall.

18. The irrigation control device of claim 16, further comprising a housing forming the first and second connector terminal rows.

19. The irrigation control device of claim 16, further comprising divider walls in the first and second connector terminal rows and configured to provide a separation barrier between side-by-side oriented electrical connection pads of the first and second connector terminal rows.

20. The irrigation control device of claim 16, wherein the electrical connection pads of the second connector terminal row are horizontally offset in the first horizontal plane from the electrical connection pads of the first connector terminal row such that the wires exiting the second connector terminal row are horizontally offset from the wires exiting the first connector terminal row.

21. The irrigation control device of claim 16, wherein the first connector terminal row is horizontally offset in the first horizontal plane from the second connector terminal row such that the wires exiting the second connector terminal row are horizontally offset from the wires exiting the first connector terminal row.

22. An irrigation control device comprising:
a circuit board;
a first connector terminal row located in a first horizontal plane;
a second connector terminal row located in the first horizontal plane adjacent to the first connector terminal row;
a plurality of terminal connectors, each secured to a respective one of electrical connection pads of the first and second connector terminal rows, wherein each terminal connector is configured to receive a conductive exposed end of a wire and retain the wire against the respective electrical connection pad;
a ridge located between the first and second connector terminal rows and extending above the first horizontal plane, wherein the ridge is configured to support the wires retained in and extending from the second connector terminal row above the wires retained in and extending from the first connector terminal row; and
a support plate connected to an under surface of the circuit board, wherein the support plate is configured to support connection of the terminal connectors to the electrical connection pads of the second connector terminal row.

* * * * *

UNITED STATES PATENT AND TRADEMARK OFFICE
CERTIFICATE OF CORRECTION

| | |
|---|---|
| PATENT NO. | : 11,552,417 B2 |
| APPLICATION NO. | : 16/944909 |
| DATED | : January 10, 2023 |
| INVENTOR(S) | : Walker et al. |

It is certified that error appears in the above-identified patent and that said Letters Patent is hereby corrected as shown below:

In the Claims

Column 13, Line 11, Claim 16 delete "terminal connector" and insert -- terminal --, therefor.

Column 13, Line 21, Claim 17 delete "of claimer" and insert -- of claim --, therefor.

Signed and Sealed this
Twenty-third Day of May, 2023

Katherine Kelly Vidal
*Director of the United States Patent and Trademark Office*